(12) United States Patent
Unger et al.

(10) Patent No.: US 8,795,522 B2
(45) Date of Patent: Aug. 5, 2014

(54) LUBRICATING OIL CONDITIONING FILTER CONTAINING IMPROVED PELLETIZED CONDITIONER

(75) Inventors: Peter D. Unger, Morristown, NJ (US); Ronald P. Rohrbach, Flemington, NJ (US); Zafar Hussain, Perrysburg, OH (US); Weston H. Gerwin, Perrysburg, OH (US); Brian K. Artz, Maumee, OH (US); Daniel E. Bause, Flanders, NJ (US)

(73) Assignee: Fram Group IP LLC, Lake Forest, IL (US)

( * ) Notice: Subject to any disclaimer, the term of this patent is extended or adjusted under 35 U.S.C. 154(b) by 1491 days.

(21) Appl. No.: 12/048,785

(22) Filed: Mar. 14, 2008

(65) Prior Publication Data

US 2008/0223780 A1 Sep. 18, 2008

Related U.S. Application Data

(60) Provisional application No. 60/895,131, filed on Mar. 15, 2007.

(51) Int. Cl.

| B01D 27/00 | (2006.01) |
| B01D 35/30 | (2006.01) |
| B01D 37/02 | (2006.01) |
| F01M 9/02 | (2006.01) |
| F01M 11/03 | (2006.01) |

(52) U.S. Cl.
CPC ............... *F01M 9/02* (2013.01); *B01D 35/306* (2013.01); *B01D 37/025* (2013.01); *F01M 11/03* (2013.01)
USPC ........ 210/206; 210/483; 210/500.1; 210/501; 210/504; 210/506; 210/510.1; 210/416.5

(58) Field of Classification Search
USPC ............ 210/130, 203, 204, 206, 435, 500.21, 210/501, 502.1, 510.1, 416, 483, 500.1, 210/504, 506
See application file for complete search history.

(56) References Cited

U.S. PATENT DOCUMENTS

| 2,262,526 | A | * | 11/1941 | Beare et al. ............... 123/196 A |
| 5,069,799 | A | * | 12/1991 | Brownawell et al. ......... 210/749 |
| 5,478,463 | A | * | 12/1995 | Brownawell et al. ......... 208/180 |
| 5,527,452 | A | * | 6/1996 | Grigoriev et al. ............ 210/130 |

(Continued)

OTHER PUBLICATIONS

International Search Report Dated Aug. 18, 2008, International Application No. PCT/US2008/057047, 2008.

(Continued)

*Primary Examiner* — Duane Smith
*Assistant Examiner* — Thomas McKenzie
(74) *Attorney, Agent, or Firm* — Erin J. Fox; Barnes & Thornburg LLP (57) ABSTRACT

An improved oil filter, for use with an internal combustion engine, comprises a hollow filter housing defining a chamber therein and having an inlet and an outlet with a flow path therebetween; a mechanically active filter member disposed inside the filter housing in the flow path; and a chemically active filter member disposed inside the filter housing in the flow path. The chemically active filter member comprises a plurality of composite oil additive pellets. The plurality of pellets is interconnected to form a substantially integral permeable member, and the substantially integral permeable member is impregnated with an alkaline composition. The alkaline composition is provided to counteract acidic combustion products in lubricating oil in an internal combustion engine.

24 Claims, 6 Drawing Sheets

(56) References Cited

U.S. PATENT DOCUMENTS

| | | | |
|---|---|---|---|
| 6,787,033 B2 * | 9/2004 | Beard et al. | 210/323.2 |
| 7,811,462 B2 * | 10/2010 | Eilers et al. | 210/749 |
| 2002/0185454 A1 * | 12/2002 | Beard et al. | 210/749 |
| 2004/0091654 A1 * | 5/2004 | Kelly et al. | 428/35.7 |
| 2004/0140255 A1 | 7/2004 | Merritt et al. | |
| 2004/0154970 A1 * | 8/2004 | Rohrbach et al. | 210/266 |
| 2006/0000760 A1 * | 1/2006 | Beard et al. | 210/203 |
| 2007/0170107 A1 * | 7/2007 | Hussain | 210/335 |

OTHER PUBLICATIONS

Written Opinion of International Searching Authority Dated Aug. 18, 2008, International Application No. PCT/US2008/057047, 2008.

* cited by examiner

LUBRICATING OIL CONDITIONING FILTER CONTAINING IMPROVED PELLETIZED CONDITIONER

CROSS REFERENCE TO RELATED APPLICATION

This application claims the benefit of U.S. patent application Ser. No. 60/895,131, filed Mar. 15, 2007, the contents of which are incorporated herein by reference thereto.

BACKGROUND

Exemplary embodiments of the present invention relate to an oil filter apparatus for use in conjunction with an internal combustion engine. More particularly, exemplary embodiments of the present invention relate to an oil filter apparatus including both a mechanically active filter element and a chemically active filter element incorporated therein.

Oil has a number of important functions in an internal combustion engine. The motor oil lubricant reduces friction that causes wear on metallic components, dissipates heat, seals the combustion chamber, and cleans the engine space by dissolving and dispersing impurities.

Nevertheless, it is well known that during normal operation of an internal combustion engine, particularly a diesel engine, motor oils become contaminated during operation from accumulating combustion particles, foreign substances and abrasion particles. These contaminants include, among other substances, soot, which is formed from incomplete combustion of the fossil fuel, and acids that are a by product of combustion. Both of these contaminants are typically either introduced into the lubricating oil with exhaust gas in the form of blow-by or deposited on cylinder walls and subsequently deposited into the oil. This contamination tends to increase oil viscosity and to generate unwanted engine deposits, leading to increased engine wear. Increased viscosity leads to higher temperatures, higher pumping costs, and the risk of lubricant starvation, especially at start-up. For these primary particles not to cause any damage inside the internal combustion engine, they must be removed from the oil circulation system.

The conventional solution to soot-related problems has been to place various soot agglomeration resistant dispersant additives into lubricating oils. These dispersants may be corrosion inhibitors, antioxidants, friction modifiers, pour point depressants, detergents, viscosity index improvers, anti-wear agents, and/or extreme pressure additives. Dispersants control contamination by attaching themselves to contaminant particles and holding them in suspension. The suspended particles are so finely divided that they pass harmlessly between mating surfaces and through oil filters. The contamination, however, is not actually removed from the engine system until the oil is changed.

With conventional additive methods, the amount and concentration of dispersants are limited by the ability of lubricating oils to suspend the additives, as well as by the chemical stability of these dispersants in the oil. Thus, dispersants work well for a short period, providing once-through protection, but once the dispersants are depleted, the engine left at risk. Additionally, due to the solubility and chemical stability limits of dispersants in the oil, the service lives of the lubricating oil and the oil filter are less than optimal.

To counteract the effects of acidic combustion related problems, many conventional systems include neutralizing additives known as over-based detergents. These are a source of TBN (total base number), which is a measure of the capacity of the oil to neutralize acids. As a quantity of lubricating oil neutralizes acidic combustion products, the oil's ability to do so, that is, its TBN, is gradually reduced, necessitating an oil change. The depletion of the TBN is an important limiting factor for many internal combustion engines, particularly for heavy-duty diesel engines.

Oil conditioning techniques have been used as an alternative to the conventional method of mixing additives with lubricating oil for removing soot and acid contaminants from the oil. Oil conditioning employs filtration to remove contaminants from lubricating oils. Filtration systems chemically and/or mechanically separate insoluble particulate matter from a fluid by passing the fluid through a filter medium that will not allow the particulates to pass through. Most such filters use a mechanical or 'screening' type of filtration, with a replaceable cartridge having a porous filter element therein, through which the oil is repeatedly cycled to remove impurities. An oil-conditioning filter protects the engine from harmful particles by repeatedly cycling the engine's lubricating oil therethrough.

For example, in order to combat the build up of sludge in oil, U.S. Pat. No. 5,478,463 ("the '463 patent") and U.S. Pat. No. 5,042,617 ("the '617 patent") both disclose an oil filter and a method for reducing the amount of sludge in lubricating oil as it circulates throughout an engine. These patents provide for the inclusion of particles in an oil filter that are oil insoluble and oil wettable, and which complex with sludge so that at least some of the sludge that these particles come into contact with is immobilized on the particles. The '617 patent discloses the inclusion of oil insoluble and oil wettable particles in an oil filter that are retained on a pelletized substrate, whereas the '463 patent discloses the inclusion of such particles that are not retained on a substrate, but are nonetheless retained in the oil filter.

Analogously, U.S. Pat. No. 5,069,799 ("the '799 patent") discloses an oil filter and method for reducing the amount of combustion acids in lubricating oil. In particular, the '799 patent discloses a method of rejuvenating lubricating oil, which includes reducing combustion acids, by serially passing the oil through first a chemically active filter media, then a physically active filter media, and finally an inactive filter media. In this patent, the chemically active filter media includes a strong base to displace weak bases that have combined with combustion acids. The combustion acid and the strong base then combine to form a salt that is subsequently trapped by mechanical filter media.

U.S. Pat. No. 5,225,081 ("the '081 patent") discloses a method of removing polynuclear aromatics from used lubricating oil. The method of the '081 reference involves passing oil through a staged oil filter system that may include a chemically active filter media. The chemically active filter media is made of a composite material that includes particles of an active component and a thermoplastic binder, which are products of a heated extrusion process. Basic conditioners are given as one example of materials suitable for use as chemically active filter media. Activated carbon is also emphasized as being a preferred component of the filter media.

Some designs for multiple stage oil filters are known, such as those disclosed in U.S. Pat. Nos. 4,557,829 and 4,886,599, These patents disclose a filter cartridge with sequential concentric cylindrical filter elements, for both chemical and mechanical filtration of oil contained in an oil-sealed vacuum pump.

Other designs for oil filters that contain extra additives and dispense those additives into oil, over time, are disclosed in U.S. Pat. Nos. 4,075,098 and 5,552,040.

While the above discussed methods for removing soot and acid contaminants from lubricating oil are usable for their intended purposes, the prior art fails to account for engine modifications such as exhaust gas recirculation (EGR) that are being incorporated as more rigorous exhaust emission regulations continue to be adopted and enforced.

EGR is a $NO_x$ (nitrogen oxide and nitrogen dioxide) reduction technique that is used in most gasoline and diesel engines and works by recirculating a portion of an engine's exhaust gas back into the intake stream. Exhaust gases have already combusted, so they do not burn again when they are recirculated. Intermixing the incoming air with recirculated exhaust gas dilutes the mix with inert gas, thereby slowing and cooling the combustion process by several hundred degrees, and (in diesel engines) reducing the amount of excess oxygen. Because $NO_x$ formation progresses much faster at high temperatures, EGR serves to limit the generation of $NO_x$.

While processes such as EGR serve to reduce exhaust emissions into the atmosphere, the recirculated engine emission loads are returned to the combustion chamber and collected in the lubricating oil, thereby resulting in rapid TBN depletion due to acid formation and the generation of dramatically higher levels of soot during combustion. Thus, particularly because of the acids formed in the oil as oxidation products as well as the acidic nature of the blow-by gas, the use of EGR can significantly reduce the useful life of the engine's lubricating oil.

Accordingly, there is a need for an improved oil conditioning filter that can extend the useful lubricating oil life in a vehicle equipped with an EGR system, particularly a vehicle having a diesel engine, so as to allow a user to extend the time interval between oil changes in a vehicle.

SUMMARY OF THE INVENTION

Exemplary embodiments of the present invention are directed to an oil filter for use with an internal combustion engine. The oil filter comprises a hollow filter housing defining a chamber therein and having an inlet and an outlet with a flow path therebetween; a mechanically active filter member disposed inside the filter housing in the flow path; and a chemically active filter member disposed inside the filter housing in the flow path. The chemically active filter member comprises a plurality of composite oil additive pellets. The plurality of pellets is interconnected to form a substantially integral permeable member, and the substantially integral permeable member is impregnated with an alkaline composition. The alkaline composition is provided to counteract acidic combustion products in lubricating oil in an internal combustion engine.

Exemplary embodiments of the present invention are also directed to a process of making a chemically active filter element of the type described.

Exemplary embodiments of the present invention are also directed to an oil filter that comprises a hollow housing having a base plate for placement proximate an engine surface, a mechanically active filter element disposed within the housing spaced away from the base plate, a substantially cylindrical dividing wall member disposed within the housing adjacent the base plate, and a chemically active filter member. The base plate has an outlet aperture formed therethrough and an inlet aperture formed therethrough and spaced apart from the outlet aperture. The dividing wall member defines an inlet flow channel on the outside thereof within the housing and in fluid communication with the inlet aperture of the base plate. The dividing wall member further defines an outlet flow channel therein in fluid communication with the outlet aperture of the base plate. The chemically active filter member is disposed within the inlet flow channel of the housing between the base plate and the mechanical filer element. The chemically active filter member comprises a plurality of composite oil additive pellets being interconnected to form a substantially integral permeable member. The substantially integral permeable member is impregnated with an alkaline composition.

Exemplary embodiments of the present invention are also directed to a supplemental cartridge for use in conjunction with an oil filter. The supplemental cartridge comprises a hollow cartridge housing having a base plate for placement proximate an engine surface, a cap opposite the base plate for placement proximate an oil filter, an outer wall connecting the cap and the base plate, a dividing wall member disposed within the housing, and a chemically active filter member. The base plate has an outlet aperture formed substantially centrally therethrough and an inlet aperture formed therethrough and spaced apart from the outlet aperture. The cap has an inlet aperture formed substantially centrally therethrough and an outlet aperture formed therethrough and spaced apart from the inlet aperture. The dividing wall member separates the housing interior into an inlet flow channel in fluid communication with the inlet aperture of the base plate, and an outlet flow channel in fluid communication with the outlet aperture of the base plate. The chemically active filter member is disposed within the inlet flow channel of the housing and comprises a plurality of composite oil additive pellets being interconnected to form a substantially integral permeable member. The substantially integral permeable member is impregnated with an alkaline composition For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form.

Furthermore, the terms and phrases used herein are not intended to be limiting but rather to provide an understandable description of the invention. For instance, throughout the present specification, relative positional terms like 'upper', 'lower', 'top', 'bottom', 'horizontal', 'vertical', and the like are used to refer to the orientation of the filters shown in the drawings. These terms are used in an illustrative sense to describe the depicted exemplary embodiments and are not meant to be limitative. It will be understood that in particular applications, a filter may be installed on an engine in an orientation different from that shown in the drawings (for example, inverted 180 degrees or transverse to that shown), and in such a case, the above-identified relative positional terms will no longer be accurate.

Figure 1:
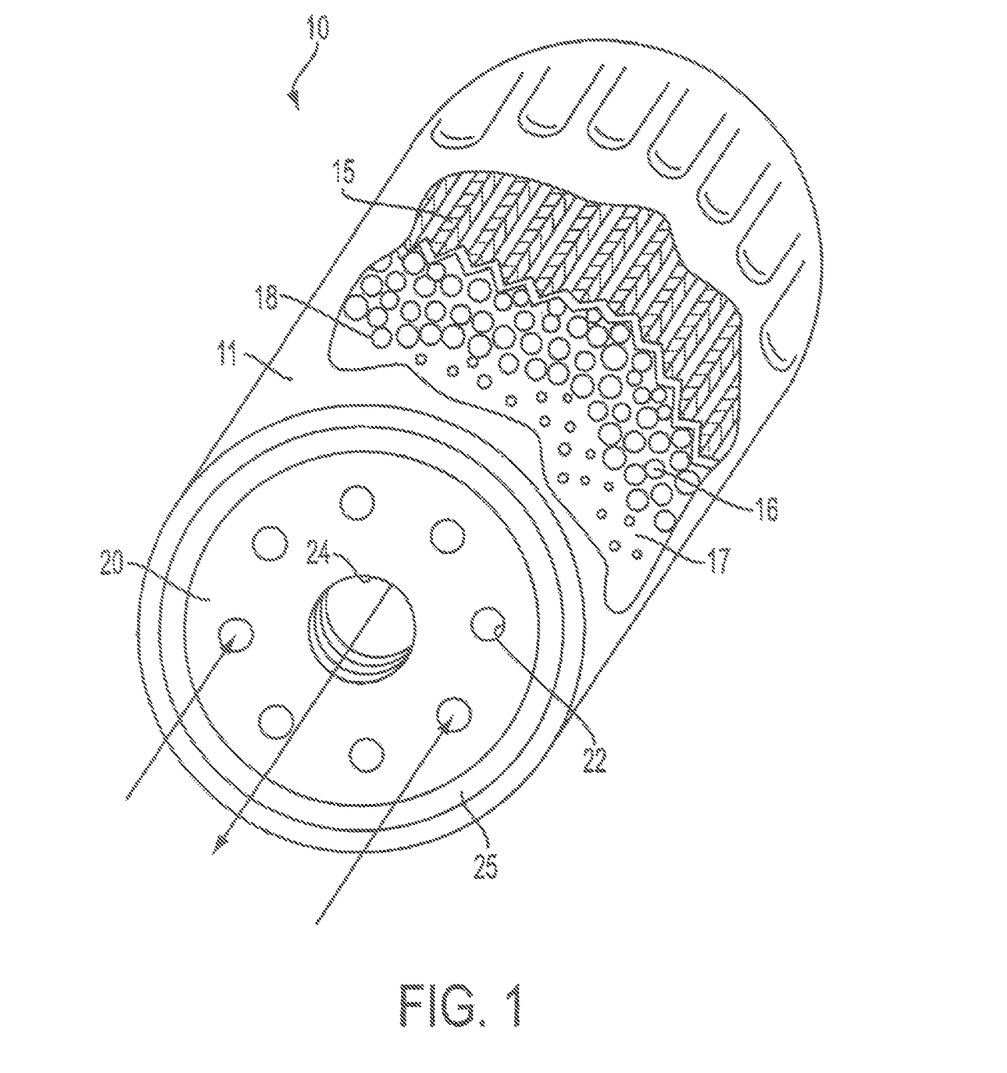
FIG. 1 is a perspective view, partially cut away, of an oil filter in accordance with a first exemplary embodiment of the present invention.
Figure 2:
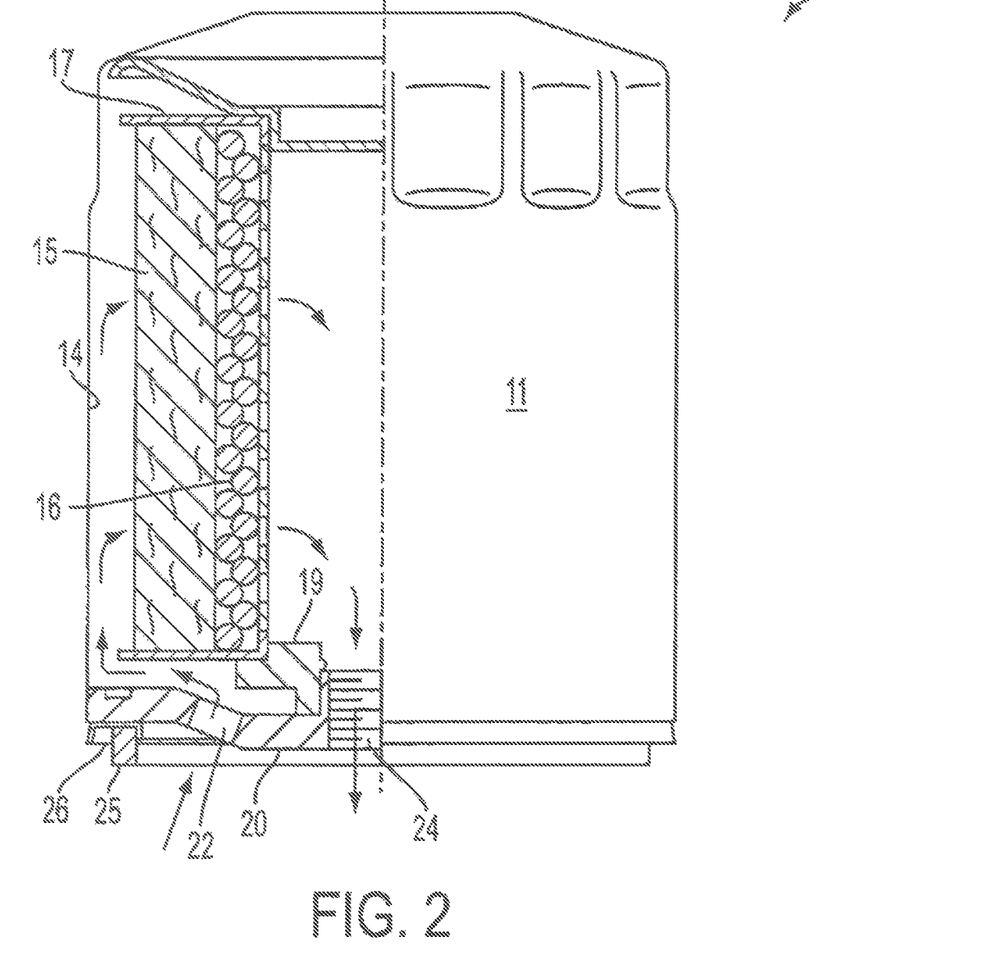
FIG. 2 is a cross-sectional view of the exemplary filter of FIG. 1.

FIGS. 1 and 2 illustrate an oil filter 10 in accordance with a first exemplary embodiment of the present invention. The direction of oil flow through oil filter 10 is indicated by the arrows in FIG. 2, which illustrate a flow path through the filter.

Oil filter 10 generally includes a hollow cylindrical housing 11 which defines a chamber 14 therein, a porous mechanically active filter element 15 retained within that chamber, and a chemically active filter element 16 that includes a plurality of individual, composite additive pellets 18 and is also retained within the chamber inside the housing. A porous cylindrical screen or support frame 17 may optionally be provided within housing 11 to supportively retain filter elements 15, 16.

In the present exemplary embodiment, additive pellets 18, of which chemically active filter element 16 is comprised, are made of a combination of materials that primarily includes a basic conditioner held together with a polymeric binder. Optionally, the additive pellets may be made exclusively of basic conditioner and binder, in order to maximize the level of active ingredient therein. In exemplary embodiments, binders in the practice of the present invention can be thermoplastics such as polyamides, polyimides, polyesters, polyolefins, polysulfones, and mixtures thereof.

Additive pellets 18 include one or more additives which may be selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, mixtures of the above additives, and/or other known beneficial additives.

The basic conditioner of additive pellets 18, when used in exemplary embodiments, can be a basic salt selected from the group consisting of calcium carbonate, potassium carbonate, potassium bicarbonate, aluminium dihydroxy sodium carbonate, magnesium oxide, magnesium carbonate, zinc oxide, sodium bicarbonate, sodium hydroxide, calcium hydroxide, potassium hydroxide, and mixtures thereof Other materials may also be included in the additive pellets in exemplary embodiments, if desired.

A grommet 19 or other internal sealing member is provided centrally at the base of frame 17 to route the oil along the flow path and through filter elements 15, 16. Grommet 19 may include a flexibly resilient sealing member having an integral pressure relief valve therein, such as that disclosed in U.S. Pat. No. 6,214,215, the disclosure of which is incorporated herein by reference thereto in its entirety. In an alternative exemplary embodiment, oil filter 10 may incorporate a spring-loaded or other conventional pressure relief valve.

A base plate 20 of housing 11 includes a plurality of inlet ports 22 formed therethrough and arranged in a circular pattern. Base plate 20 also includes a central outlet port 24. Outlet port 24 has a plurality of female threads formed therein to allow rotatable mounting of oil filter 10 on an externally threaded hollow tubular fitting on an engine block (not shown). An annular external sealing member 25 fits engagingly into a groove 26 formed at the bottom surface of base plate 20 to resist oil leakage outwardly from the base of oil filter 10.

In the exemplary embodiment depicted in FIGS. 1-2, mechanically active filter element 15 is a conventional cylindrical member made of accordion-pleated filter paper. Chemically active filter element 16 is also provided in the shape of a cylinder in the present exemplary embodiment, and is disposed radially and coaxially within mechanically active filter element 15. Chemically active filter element 16 is located inside of, and therefore downstream from, mechanically active filter element 15, thereby allowing a mechanical filtration to take place before the chemical reaction of unwanted contaminants from the oil with the basic conditioner of chemically active filter element 16.

Placement of chemically active filter element 16 between the mechanically active filter element 15 and frame 17, as illustrated in the first exemplary embodiment, allows chemically active filter element 16 to be located downstream from mechanically active filter element 15 while still receiving maximum support from frame 17. This may be helpful where the additive composition is composed of a plurality of separate and unconnected individual pellets.

In an alternative exemplary embodiment, and in accordance with the present invention, the individual additive pellets making up the additive composition may be bonded together or otherwise cohesively associated with one another to form a substantially integral, yet highly porous filter element capable of independently supporting itself. Where the pellets are joined to form a porous matrix in this manner, the frame is not needed, and may be omitted if desired. The size of the interstitial spaces within the matrix of such a porous filter element can be specifically chosen and engineered to screen out most complexes that result from a reaction between combustion acids in the filtered oil and the basic conditioner of the pellets without substantially reducing the flow rate through the chemically active filter member.

In exemplary embodiments, one or more alkaline agents may be introduced into the additive pellets. The alkaline agents may be selected from the highly reactive and strongly basic Group IA and IIA metal hydroxides consisting of: lithium hydroxide, sodium hydroxide, potassium hydroxide, rubidium hydroxide, cesium hydroxide, francium hydroxide, beryllium hydroxide, magnesium hydroxide, calcium hydroxide, strontium hydroxide, barium hydroxide, and radium hydroxide, and mixtures thereof.

In exemplary embodiments, the alkaline agents may be introduced into the additive pellets of the porous filter element using one of many known impregnation techniques. In a non-limiting exemplary embodiments, the pellets can be deposited in a vessel that is filled with a solution of the alkaline agents such that the solution penetrates the porous filter element and delivers the agents to the pores. Following the soaking, excess fluid can be drained from the vessel. In other non-limiting exemplary embodiments, the pellets can be deposited into a porous vessel, such as wire cloth or mesh basket. The porous vessel can then be dipped into a solution of the alkaline agents and removed from the alkaline solution while allowing solution to drain from the pellets. Upon being impregnated with the solution, the pellets can be dried, possibly at elevated temperatures, to remove excess solvent. In yet other non-limiting exemplary embodiments, the pellets may be fully impregnated with a solution of the alkaline agents using a rotary vessel. The rotary vessel is heated with an inert gas and purged until the pellets are saturated with the alkaline solution.

In the exemplary embodiments described above, the processes for impregnating the additive pellets of the porous filter element with alkaline solution may be repeated or continued until a desired loading of the alkaline agents into the pellets is achieved. In exemplary embodiments, the alkaline agents can be applied uniformly in a predetermined quantity to a preset depth of penetration, although it is conceivable to have an increased concentration of the alkaline components at certain locations in the porous matrix. Because penetration into the additive pellets is hindered by air that may be trapped in the pellet pores, various techniques such as pressurizing, vacuum treatment or degassing, acoustic activation, and the like may be utilized to facilitate the impregnation process.

During use of the exemplary embodiment depicted in FIGS. 1-2, as hot lubricating oil slowly flows past the chemically active filter element, the alkaline agents introduced therein, as well as the basic conditioner thereof (if present), act to counteract and neutralize acidic combustion products in the oil. Although a basic conditioner, if present, will neutralize acidic combustion products by itself, impregnating the pellets of the filter element with alkaline agents as described in exemplary embodiments above can significantly increase neutralization capacity, thereby making the filter element particularly suitable for an engine employing an EGR oil stream. The enhanced neutralization of acidic combustion products allows for a much longer useful life of additives such as, for example, dispersants and zinc dialkyldithiophosphate (ZDDP), which are provided in the oil by the manufacturer. This, in turn, allows for greater intervals between oil changes than is possible using a chemically active filter element without alkaline agent impregnated additive pellets.

In accordance with a non-limiting exemplary embodiment, the alkaline agents introduced to the pellets are immobilized within the porous filter element so as to have minimal dissemination into the oil passing therethrough. This may be accomplished through chemical reactions in the porous filter element that occurs as a result of the introduction of the alkaline agents to the additive composition. More specifically, the metal hydroxides may react with a silicon component supported within the additive composition to form oil insoluble silicates capable of neutralizing acidic by products in the lubricating oil. The silicon component according to this exemplary embodiment can be any compound primarily composed of silicon, such as diatomaceous earth (also known as Celite) and fuller's earth.

A non-limiting example of such a chemical reaction would be the combination of sodium hydroxide and Celite R635 to form an oil insoluble sodium silicate in which the sodium infused therein is immobilized. The resulting alkaline silicate demonstrates good mechanical strength.

By immobilizing the alkaline agents in this fashion, it is possible to decrease the alkaline agent concentration in the oil because the metal hydroxides are permanently bound to the porous filter element and thus cannot be washed out during use. Furthermore, the filtration efficiency is not impaired to an unacceptable extent with respect to the degree of separation and in particular with respect to mechanical stability.

In accordance with a non-limiting exemplary embodiment, barrier coatings are applied to the pellets to provide the pellets with impermeability to carbon dioxide and/or moisture. These barrier coatings may be selected from the group consisting of waxes, viscous oils, alkylsiloxane polymers, methacrylic acid copolymers, stearic acid based films, and the like.

The barrier coatings may be applied using one of many known coating techniques. In a non-limiting exemplary method, coating materials with a sufficiently low melting point may be heated until liquefied, at which point the coating materials can then be applied in a thin layer on the pellets. In an alternative non-limiting exemplary method, the coating material may be dissolved in a suitable aqueous or organic solvent and applied as a solution. Applying a resulting melt or solution of coating material can consist of dipping, spraying, painting, dropping, or the like, or the pellets may simply be immersed in the solution or melt and then quickly withdrawn to form the carbon dioxide and/or moisture barrier coating.

In exemplary embodiments, the amount of barrier material applied can be minimized while still providing the pellets with good carbon dioxide and moisture repellent properties. Further, in exemplary embodiments, the carbon dioxide and/or moisture barrier material can be dissolvable or removable from the pellets upon contact with hot engine oil during actual use so as to present no deleterious effect on the engine oil or other mechanical components of the engine.

Figure 3:
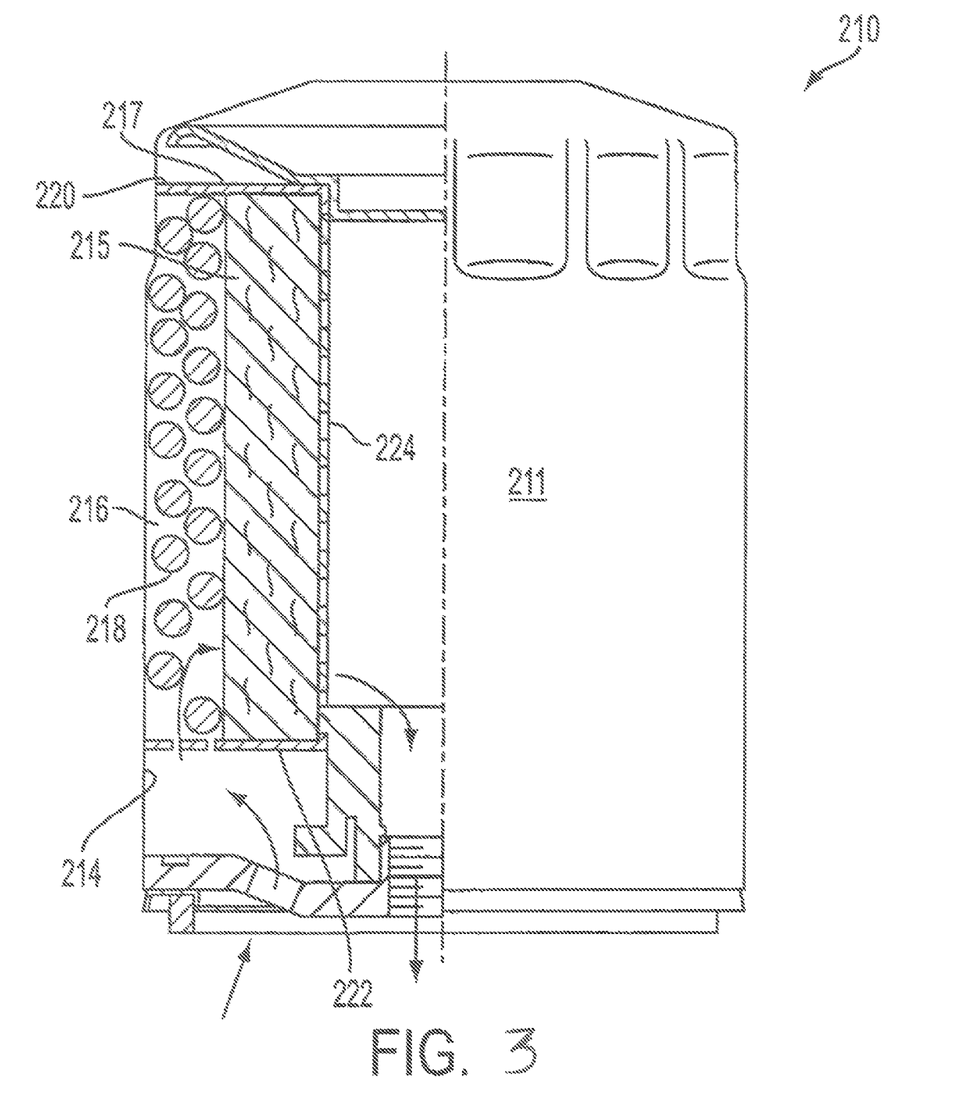
FIG. 3 is a cross-sectional view of an oil filter according to a second exemplary embodiment of the present invention.

Referring now to FIG. 3, a cross-sectional view of an oil filter 210 in accordance with a second exemplary embodiment of the present invention is illustrated. Oil filter 210 generally includes a cylindrical housing 211 that defines a hollow space 214 therein, a porous mechanically active filter element 215 within that space, and a chemically active filter element 216 that is made up of a plurality of individual composite additive pellets 218, which are also retained within the hollow space inside housing 211 and disposed within mechanically active filter element 215. Additive pellets 218 are substantially identical to additive pellets 18 described in connection with the first exemplary embodiment described with reference to FIGS. 1 and 2.

In the present exemplary embodiment, as with the exemplary embodiment described with reference to FIGS. 1 and 2, the individual additive pellets 218 making up chemically active filter element 216 may be bonded together or otherwise cohesively associated with one another to form a substantially integral, yet highly porous filter element 216 capable of independently supporting itself. With the exception of the configuration and placement of the respective mechanical and chemically active filter elements 215, 216 as specified in this section, oil filter 210 is substantially identical to oil filter 10 of the first exemplary embodiment, described hereinabove.

Mechanically active filter element 215 comprises a conventional cylindrical member made of accordion-pleated filter paper. Chemically active filter element 216 is also provided in the shape of a cylinder and disposed radially and coaxially outside of mechanically active filter element 215. A porous cylindrical screen or support frame 217 may, optionally, be provided within housing 211 to supportively hold the filter elements 215, 216 therein. In this exemplary embodiment, chemically active filter element 216 is located outside of, and therefore upstream from, mechanically active filter element 215, thereby allowing chemical modification of acids or other unwanted contaminants which may be present in the oil with the beneficial additive pellets 218 prior to mechanical filtration.

In the present exemplary embodiment, in contrast to the first exemplary embodiment described with reference to FIGS. 1 and 2, the top and bottom horizontal segments 220, 222 of frame 217 have been extended outwardly towards the outer wall of housing 211 to contain the additive pellets 218 of chemically active filter element 216 therebetween. The portion of bottom horizontal segment 222 below chemically active filter element 216, however, is made porous to allow oil to flow freely therethrough. A vertical inner wall 224 of frame 217 is also necessarily porous to allow oil flow therethrough.

Figure 4:
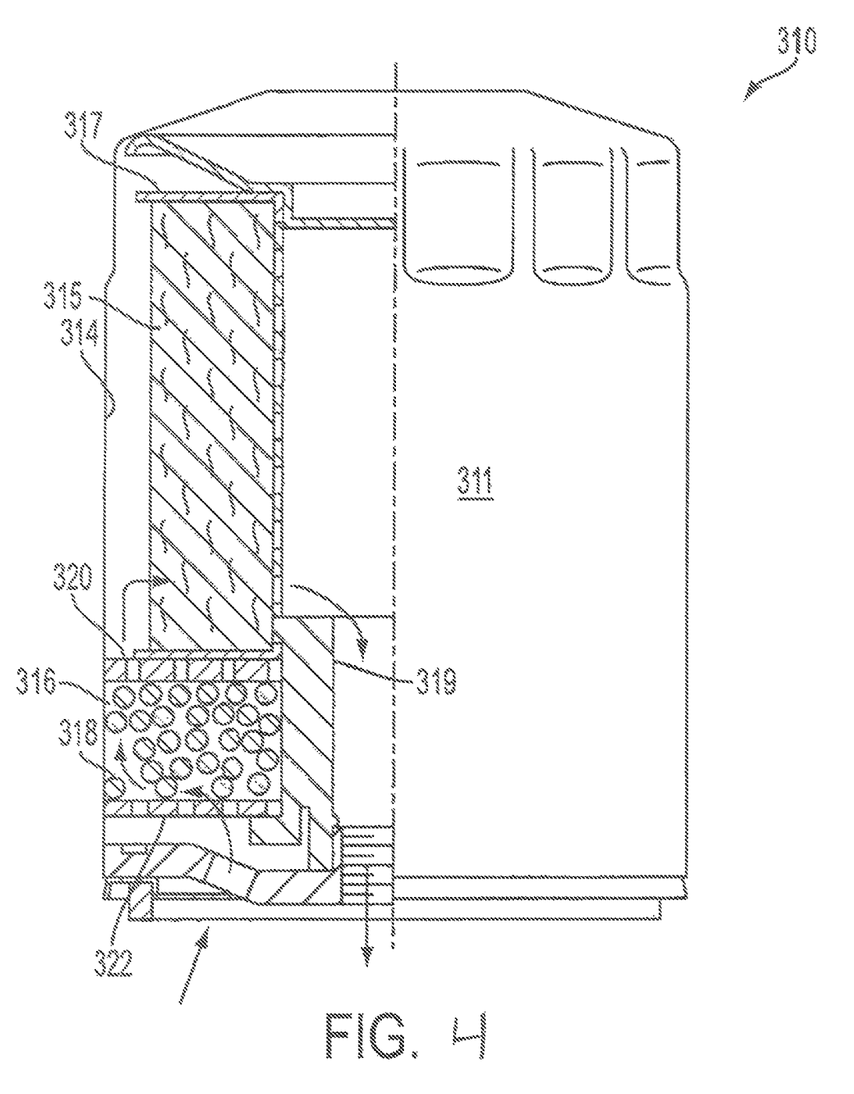
FIG. 4 is a cross-sectional view of an oil filter according to a third exemplary embodiment of the present invention.

Referring now to FIG. 4, a cross-sectional view of an oil filter 310 in accordance with a third exemplary embodiment of the present invention is illustrated. With the exception of the configuration and placement of the respective mechanical and chemically active filter elements 315, 316 and related components, and unless otherwise specified in this section, oil filter 310 is substantially identical to oil filter 10 of the first exemplary embodiment, as described with relation to FIGS. 1 and 2 above.

Oil filter 310 generally includes a hollow cylindrical housing 311 which defines a chamber 314 therein, a porous mechanically active filter element 315 within that chamber, and a chemically active filter element 316 that is made up of a plurality of individual composite additive pellets 318 that are also retained within the chamber inside the housing and disposed below and before the mechanically active filter element. Additive pellets 318 are substantially identical to additive pellets 18 described in connection with the first exemplary embodiment 10. The arrows in the drawing show the flow path through the filter.

As in the first exemplary embodiment, the individual additive pellets 318 making up chemically active filter element 316 may be bonded together or otherwise cohesively associated with one another to form a substantially integral, yet highly porous filter element 316 capable of independently supporting itself.

In the exemplary embodiment depicted in FIG. 4, mechanically active filter element 315 is a conventional cylindrical member made of accordion-pleated filter paper. A selectively porous cylindrical screen or support frame 317 may, optionally, be provided within housing 311 to supportively hold mechanically active filter element 315 therein. Additionally, porous annular upper and lower porous dividers 320, 322 may be placed above and/or below chemically active filter element 316 to retain the additive pellets 318 therebetween. Dividers 320 and/or 322, where used, may be selectively porous solid plates or mesh screens. Upper divider 320 is constructed and arranged to pass oil only to the outside surface of mechanically active filter element 315, so that the oil must be mechanically filtered before exiting oil filter 310.

As illustrated in the exemplary embodiment of FIG. 4, chemically active filter element 316 is provided in the shape of a flattened cylinder and disposed below mechanically active filter element 315. Chemically active filter element 316 is located below mechanically active filter element 315, and therefore precedes mechanically active filter element 315 in the flow path to allow chemical modification of acids or other unwanted contaminants that may be present in the oil with the beneficial additive pellets 318 prior to mechanical filtration. A central sealing member 319 is also provided and is similar to grommet 19 described in connection with the first exemplary embodiment.

The implementation of the present exemplary embodiment can ensure that the oil will pass completely through chemically active filter element 316 before it reaches the mechanically active filter element 315, and provide more and longer-lasting interaction between the oil and chemically active filter element 315 than does the exemplary embodiment depicted in FIG. 3.

Figure 5:
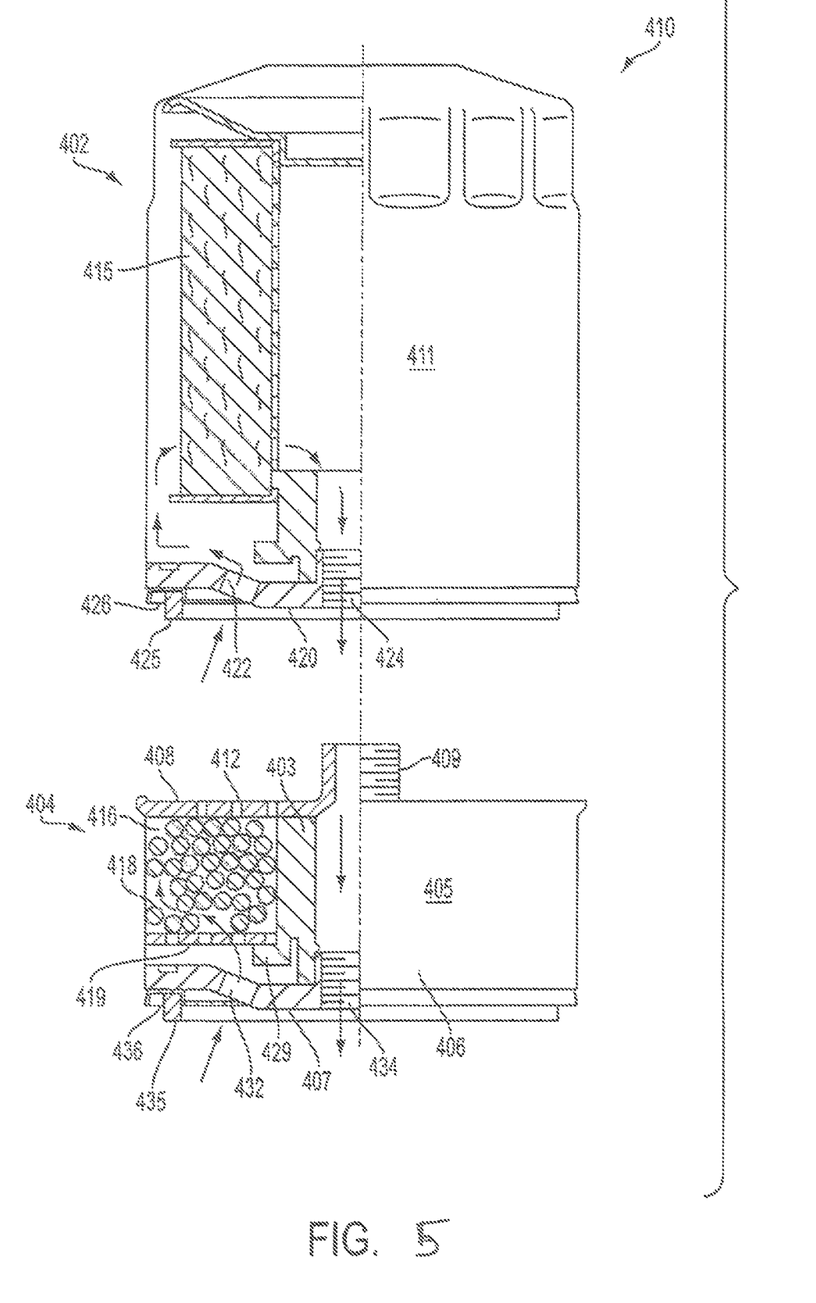
FIG. 5 is an exploded cross-sectional view of a two-part oil filter assembly according to a fourth exemplary embodiment of the present invention.

Referring now to FIG. 4, an oil filter assembly 410 in accordance with a third exemplary embodiment of the present invention is illustrated. Oil filter assembly 410 includes two primary parts, a conventional oil filter 402, shown on top in the drawing, and a supplemental cartridge 404, shown below conventional filter 402.

Conventional oil filter 402 incorporates a mechanically active filter element 415 within a cylindrical housing 411. Conventional oil filter 402 further comprises a base plate 420 that includes a plurality of inlet ports 422 arranged in a circular pattern as well as a central outlet port 424. Base plate 420 is provided as an integral part of cylindrical housing 411, and an annular sealing member 425 fits engagingly into a groove 426 formed at the bottom surface of base plate 420. Outlet port 424 has a plurality of female threads formed therein to allow rotatable mounting of oil filter 402 on an externally threaded hollow tubular male connector fitting 409 of supplemental cartridge 404.

Supplemental cartridge 404 is made to rotatably and threadably attach to an externally threaded hollow tubular fitting on an engine block (not shown), and to then have conventional filter 402 rotatably and threadably fit thereon. Supplemental cartridge 404 includes a cylindrical housing 405 having a sidewall 406, a base plate 407 sealably connected to the bottom edge of sidewall 406, and a cover plate 408 sealably connected to the top edge of the sidewall 406.

Cover plate 408 has a plurality of outlet openings 412 formed therein above chemically active filter member 416 to allow oil to flow outwardly from supplemental cartridge 404 and then into the inlets 422 of conventional oil filter 402.

Base plate 407 of supplemental cartridge 404 includes a plurality of inlet ports 432 arranged in a circular pattern, as well as a central outlet port 434. Base plate 407 is provided as an integral part of cylindrical housing 405, and an annular sealing member 435 fits engagingly into a groove 436 formed at the bottom surface of base plate 407. Outlet port 434 has a plurality of female threads formed therein to allow rotatable mounting of supplemental cartridge 404 to an externally threaded hollow tubular fitting on an engine block (not shown).

Hollow tubular male connector fitting 409, which is externally threaded, is provided at the center of cover plate 408, and a cylindrical dividing wall member 403 is centrally disposed within cartridge housing 405 to form a fluid seal at the top and bottom surfaces thereof. Cylindrical dividing wall member 403 can be made of an oil-tolerant elastomer in exemplary embodiments.

Supplemental cartridge 404 contains a chemically active filter element 416 therein. Chemically active filter element 416 is made up of a plurality of individual composite additive pellets 418, which are retained within the hollow space inside cartridge housing 405 and disposed radially outside of cylindrical dividing wall member 403. The additive pellets 418 are substantially identical to the additive pellets 18 described in connection with the first exemplary embodiment.

As in the first exemplary embodiment described above with reference to FIGS. 1 and 2, the individual additive pellets 418 making up chemically active filter element 416 may be bonded together or otherwise cohesively associated with one another to form a substantially integral, yet highly porous filter element capable of independently supporting itself.

Additionally, in the present exemplary embodiment depicted in FIG. 5, a porous, annular lower mesh screen 419 may be placed below chemically active filter element 416 to retain the additive pellets 418 above chemically active filter element 416. Where used, mesh screen 419 may rest on a transverse horizontal flange 429, which is an integral part of cylindrical dividing wall member 403.

When conventional oil filter 402 is attached to supplemental cartridge 404, the total assembly functions in a manner similar to exemplary oil filter 310 illustrated in FIG. 4. Chemically active filter element 416 is also provided in the shape of a cylinder in the present exemplary embodiment, and when oil filter assembly 410 is considered in its entirety, chemically active filter element 416 is disposed below mechanically active filter element 415 of conventional oil filter 402. Chemically active filter element 416 therefore precedes mechanically active filter element 416 in the flow path, allowing chemical modification of acids or other unwanted contaminants which may be present in the oil with the beneficial additive pellets 418 prior to mechanical filtration.

The implementation of the present exemplary embodiment can ensure that the oil will pass completely through the chemically active filter element 416 before it reaches the mechanically active filter element 415, and can provide more and longer-lasting interaction between the oil and the chemically active filter element than the second exemplary embodiment illustrated in FIG. 3.

Figure 6:
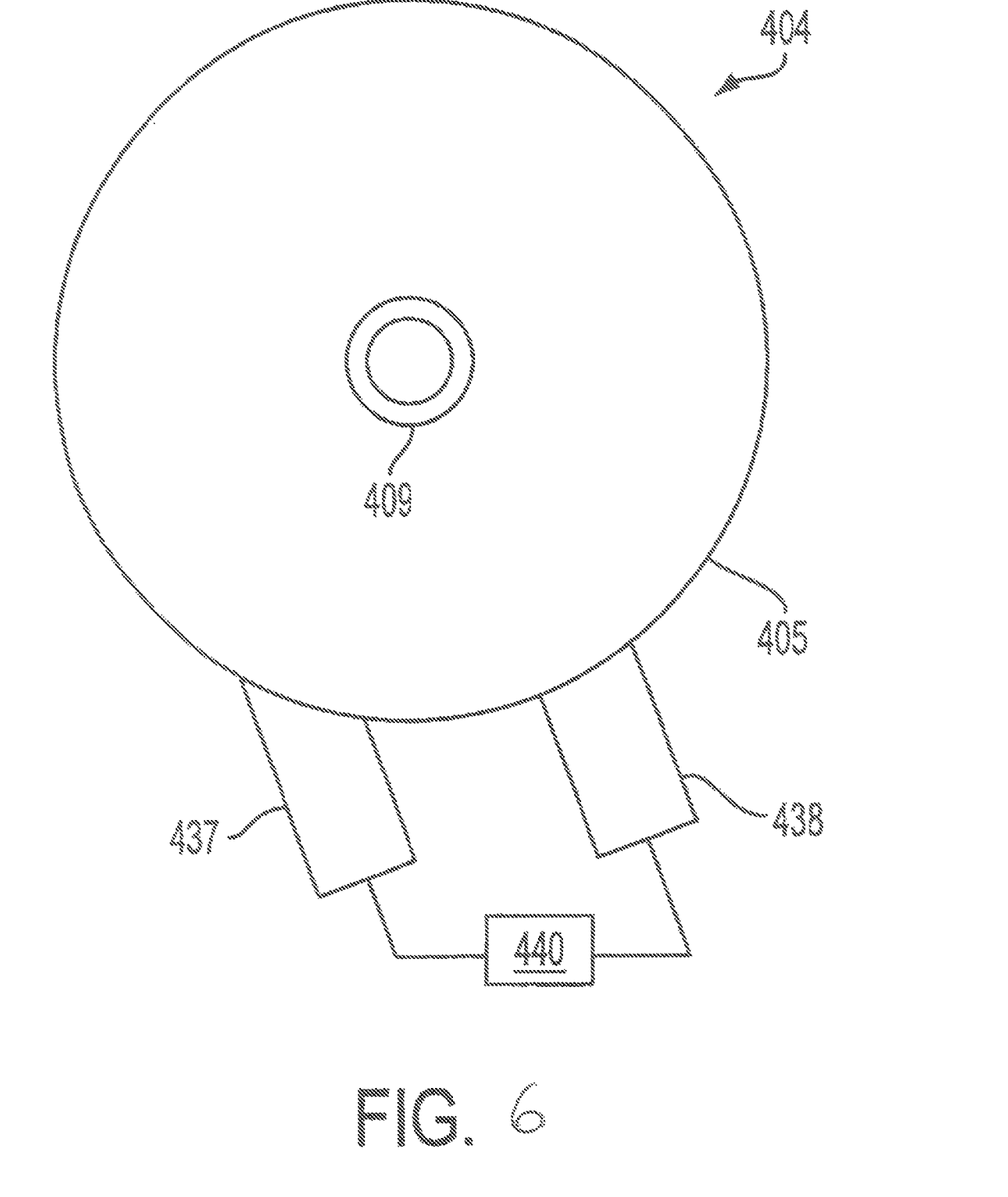
FIG. 6 is a top plan view of a supplemental cartridge, which is a component of the assembly of FIG. 5.

In an optional exemplary embodiment, as illustrated in FIG. 6, supplemental cartridge 404 may include a pair of hollow tubes 437, 438 attached to sidewall 406 thereof, which communicate with the interior of cartridge housing 405. When present, tubes 437, 438 can allow supplemental cartridge 404 to be connected to a heat exchanger 440 to allow cooling of oil passing therethrough.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed as the best mode contemplated for carrying out this invention, but that the invention will include all embodiments falling within the scope of the present application.

What is claimed is:

1. An oil filter, comprising:
   a hollow filter housing defining a chamber therein, the filter housing having an inlet and an outlet with a flow path therebetween;
   a mechanically active filter member disposed inside the filter housing in the flow path; and
   a chemically active filter member disposed inside the filter housing in the flow path, the chemically active filter member including a plurality of composite oil additive pellets bound together with a binder, wherein the bound pellets are impregnated with an alkaline composition comprised of at least one alkaline agent and wherein at least a portion of a surface of the bound and impregnated pellets is coated with a barrier material selected from the group consisting of waxes, alkylsiloxane polymers, methacrylic acid copolymers, stearic acid based films, and mixtures thereof.

2. The oil filter of claim 1, wherein each of the additive pellets comprises at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof.

3. The oil filter of claim 2, including a basic conditioner that comprises a basic salt selected from the group consisting of calcium carbonate, potassium carbonate, potassium bicarbonate, aluminium dihydroxy sodium carbonate, magnesium oxide, magnesium carbonate, zinc oxide, sodium bicarbonate, sodium hydroxide, calcium hydroxide, potassium hydroxide, and mixtures thereof.

4. The oil filter of claim 1, wherein each of the additive pellets comprises a polymeric binder.

5. The oil filter of claim 4, wherein the polymeric binder is selected from the group consisting of polyamides, polyimides, polyesters, polyolefins, polysulfones, and mixtures thereof.

6. The oil filter of claim 1, wherein the mechanically active filter element is substantially cylindrical in shape, and wherein the chemically active filter element is also substantially cylindrical in shape and is disposed radially and coaxially inside of said mechanically active filter element.

7. The oil filter of claim 1, wherein the alkaline composition comprises at least one alkaline agent selected from the group consisting of lithium hydroxide, sodium hydroxide, potassium hydroxide, rubidium hydroxide, cesium hydroxide, francium hydroxide, beryllium hydroxide, magnesium hydroxide, calcium hydroxide, strontium hydroxide, barium hydroxide, and radium hydroxide, and mixtures thereof.

8. The oil filter of claim 1, wherein each of the additive pellets further comprises a primarily silicon compound that forms a substantially immobilized oil insoluble silicate with the bound and impregnated pellets.

9. The oil filter of claim 8, wherein the primarily silicon compound comprises Celite R635 and the alkaline composition comprises sodium hydroxide, such that the substantially immobilized oil insoluble silicate comprises sodium silicate.

10. The oil filter of claim 1, wherein the chemically active filter element is a product of a process comprising the steps of:
    interconnecting a plurality of composite oil additive pellets to form a substantially integral permeable member;
    impregnating the substantially integral permeable member with the alkaline composition by infusing the additive pellets with the alkaline composition until a desired loading of the additive pellets is achieved; and
    removing excess solution, if present, from the additive pellets.

11. The process of claim 10, wherein the alkaline composition comprises at least one alkaline agent selected from the group consisting of lithium hydroxide, sodium hydroxide, potassium hydroxide, rubidium hydroxide, cesium hydroxide, francium hydroxide, beryllium hydroxide, magnesium hydroxide, calcium hydroxide, strontium hydroxide, barium hydroxide, and radium hydroxide, and mixtures thereof.

12. The process of claim 10, wherein additive pellets are impregnated with the alkaline composition by depositing the additive pellets in a vessel that is filled with an aqueous solution of the alkaline composition.

13. The process of claim 10, wherein the additive pellets are impregnated with the alkaline composition by depositing the additive pellets in a porous vessel that is dipped into an aqueous solution of the alkaline composition.

14. The process of claim 10, wherein the additive pellets are impregnated with the alkaline composition by depositing the additive pellets in a rotary vessel that is heated with an inert gas of the alkaline composition and purged.

15. The process of claim 10, wherein the desired loading of the additive pellets is a uniform loading of the alkaline composition in a predetermined quantity to a predetermined depth of penetration.

16. The process of claim 10, wherein a degassing technique is used to facilitate the impregnating step.

17. The process of claim 10, wherein the additive pellets comprise a silicon component that substantially immobilizes the alkaline composition during the impregnating step by chemically reacting the alkaline composition to form an oil insoluble silicate.

18. The process of claim 10, further comprising the step of coating at least a portion of a surface of the substantially integral permeable member with the barrier material that renders the additive pellets substantially impermeable with respect to carbon dioxide and moisture.

19. The process of claim 18, wherein the step of coating at least a portion of the surface of the substantially integral permeable member with the barrier material comprises applying a liquid melt of the barrier material to the substantially integral permeable member.

20. The process of claim 18, wherein the step of coating at least a portion of the surface of the substantially integral permeable member with the barrier material comprises applying an aqueous solution of the barrier material to the substantially integral permeable member.

21. An oil filter, comprising:
- a hollow housing having a base plate for placement proximate an engine surface, the base plate having an outlet aperture formed therethrough and an inlet aperture formed therethrough and spaced apart from the outlet aperture;
- a mechanically active filter element disposed within the housing spaced away from the base plate;
- a substantially cylindrical dividing wall member disposed within the housing adjacent the base plate, the dividing wall member defining an inlet flow channel on the outside thereof within the housing and in fluid communication with the inlet aperture of the base plate, the dividing wall member further defining an outlet flow channel therein in fluid communication with the outlet aperture of the base plate; and
- a chemically active filter member disposed within the inlet flow channel of the housing between the base plate and the mechanical filer element, the chemically active filter member comprising a plurality of composite oil additive pellets bound together with a binder such that the bound pellets are cohesively associated with one another to form a permeable membrane, and the permeable membrane is impregnated with an alkaline composition, wherein at least a portion of a surface of the bound and impregnated pellets is coated with a barrier material selected from the group consisting of waxes, alkylsiloxane polymers, methacrylic acid copolymers, stearic acid based films, and mixtures thereof.

22. The oil filter of claim 21, further comprising a porous divider disposed between the chemically active filter element and the mechanically active filter element.

23. The oil filter of claim 22 further comprising:
- a cap opposite the base plate for placement proximate the oil filter, the cap having an inlet aperture formed substantially centrally therethrough and an outlet aperture formed therethrough and spaced apart from the inlet aperture; and,
- an outer wall connecting the cap and the base plate.

24. The oil filter of claim 23 further comprising an auxiliary inlet tube attached to the outer wall and being in fluid communication with the inlet flow channel thereof; and an auxiliary outlet tube attached to the outer wall of the housing and being in fluid communication with the interior thereof.

* * * * *